(12) United States Patent
Daut

(10) Patent No.: US 7,841,361 B2
(45) Date of Patent: Nov. 30, 2010

(54) ELECTROMAGNETIC HYDRAULIC VALVE

(75) Inventor: Klaus Daut, Herzogenaurach (DE)

(73) Assignee: Schaeffler KG, Herzogenaurach (DE)

( * ) Notice: Subject to any disclaimer, the term of this patent is extended or adjusted under 35 U.S.C. 154(b) by 614 days.

(21) Appl. No.: 11/814,845

(22) PCT Filed: Nov. 25, 2005

(86) PCT No.: PCT/EP2005/012606

§ 371 (c)(1),
(2), (4) Date: Jul. 26, 2007

(87) PCT Pub. No.: WO2006/079382

PCT Pub. Date: Aug. 3, 2006

(65) Prior Publication Data

US 2008/0163837 A1 Jul. 10, 2008

(30) Foreign Application Priority Data

Jan. 27, 2005 (DE) .................. 10 2005 003 446

(51) Int. Cl.
*F16K 11/07* (2006.01)
(52) U.S. Cl. .................. 137/625.69; 137/625.67; 137/625.68; 251/368
(58) Field of Classification Search .......... 251/368; 137/625.67–625.69

See application file for complete search history.

(56) References Cited

U.S. PATENT DOCUMENTS

| | | | | |
|---|---|---|---|---|
| 3,768,518 A | * | 10/1973 | Roth et al. | 137/625.66 |
| 4,611,631 A | * | 9/1986 | Kosugi et al. | 137/625.65 |
| 4,705,062 A | * | 11/1987 | Baker | 137/315.02 |
| 5,370,354 A | * | 12/1994 | Kunz | 251/129.15 |
| 5,503,180 A | * | 4/1996 | Nimberger | 137/315.28 |
| 6,578,606 B2 | * | 6/2003 | Neuhaus et al. | 137/625.65 |

FOREIGN PATENT DOCUMENTS

| | | |
|---|---|---|
| DE | 83 05 147 A | 6/1983 |
| DE | 102 30 966 A | 1/2004 |
| DE | 102 39 207 A | 3/2004 |
| EP | 1 582 794 AP | 10/2005 |

\* cited by examiner

*Primary Examiner*—John Rivell
*Assistant Examiner*—Craig Price
(74) *Attorney, Agent, or Firm*—Lucas & Mercanti, LLP

(57) ABSTRACT

An electromagnetic hydraulic valve (1), in particular proportional valve, for controlling a device for the rotational angle adjustment of a camshaft relative to a crankshaft of an internal combustion engine, composed of an electromagnet (2) with a hollow-cylindrical magnet housing (4), at least one coil winding (5), an axially moveable magnet armature (6), a first and a second pole shoe (7, 8), a valve part (3) with a hollow-cylindrical valve housing (9) having a control piston (12) which can be moved axially by the magnet armature (6) of the electromagnet (2) via a plunger rod (11). The invention consists of a sleeve (17), composed of a base (18) and a hollow-cylindrical side wall (19), which is arranged on that end of the control piston (12) and situated in the direction of the plunger rod (11), where the sleeve (17) has a greater hardness than the control piston (12).

5 Claims, 3 Drawing Sheets

ELECTROMAGNETIC HYDRAULIC VALVE

FIELD OF THE INVENTION

The invention relates to an electromagnetic hydraulic valve, in particular proportional valve, for controlling a device for the rotational angle adjustment of a camshaft relative to a crankshaft of an internal combustion engine, as per the preamble of claim 1.

BACKGROUND OF THE INVENTION

Using camshaft adjusting devices, the fuel demand of an internal combustion engine is adapted to the power which it is to output in each case. Here, the lift of the intake valves is adjusted such that the fuel quantity required for the power which is to be output is injected into the combustion chamber. In order to vary the valve lift, the camshaft is rotated relative to the crankshaft. For this purpose, an adjuster is provided which is comparable to a hydraulic cylinder. The hydraulic oil of the internal combustion engine serves as a pressure medium. The lubricating oil circuit of the internal combustion engine is utilized as a pressure oil source. The adjuster is actuated by means of the electromagnetic hydraulic valve.

DE 198 53 670 A1 discloses a generic electromagnetic hydraulic valve which is designed as a proportional valve for controlling a device for the rotational angle adjustment of a camshaft relative to a crankshaft of an internal combustion engine and is composed substantially of an electromagnet and of a hydraulic valve part which is fastened thereto. Here, the electromagnet has a hollow-cylindrical magnet housing in which are arranged at least one coil winding and an axially moveable magnet armature. Also arranged in the magnet housing are a first and a second pole shoe. The valve part of the proportional valve is, in contrast, formed by a hollow-cylindrical valve housing which is open at the end side and in the hollow cylinder of which is accommodated a control piston which can be moved axially by the magnet armature of the electromagnet via a plunger rod. Furthermore, the valve housing has, at its outer periphery, a plurality of encircling annular grooves which are spaced apart from one another axially and into which are formed in each case a plurality of radial openings which open out into the hollow cylinder of the valve housing and are formed as transverse bores. The control piston, which is of hollow-cylindrical design, of the valve part is connected here at one end side to the plunger rod of the magnet armature and at the other end side to a pressure spring which acts counter to the force of the magnet armature, and said control piston has, at its outer periphery, two annular control sections which, depending on the current supply to the electromagnet, overlap or underlap the radial openings of at least two annular grooves in the valve housing. Furthermore, the control piston has, axially, a cavity which is embodied as a longitudinal bore, which cavity is open at the pressure-spring side and, at the plunger-rod side, is connected by means of a plurality of radial windows, which are formed as radial bores, to the hollow cylinder of the valve housing, and which cavity is provided for further conveying the hydraulic medium within the valve housing.

Further electromagnetic hydraulic valves of generic design are described in DE 197 45 411 A1, DE 199 38 884 A1, DE 199 56 160 A1, DE 100 56 200 A1, DE 102 39 207 A1 and DE 103 00 974 A1.

Such control pistons which are designed as hollow pistons are generally produced from an iron material. Since considerable friction is generated in the hydraulic valve between the plunger rod and the control piston, the latter must undergo a hardening process, for example a case hardening process. In order to prevent dimensional distortion of the control piston during said hardening process, which would adversely affect the operation of the valve, only that end face of the piston which bears against the plunger rod is hardened. This is carried out in such a way that the rest of the control piston is held by a copper sleeve which must additionally be cooled. After the hardening process, the entire control piston is washed and that end face which faces toward the plunger rod subsequently additionally undergoes a grinding process. It is obvious that such a production method of a control piston is very complex and therefore also expensive.

SUMMARY OF THE INVENTION

Proceeding from the disadvantages of the known prior art, the invention is based on the object of providing, for an electromagnetic hydraulic valve, a hollow-cylindrical control piston which is in particular easy to produce and has good wear properties.

According to the invention, said object is achieved according to the characterizing part of claim 1 in connection with the preamble of said claim in that a sleeve, which is composed of a base and a hollow-cylindrical side wall, is arranged on that end of the control piston which is situated in the direction of the plunger rod, which sleeve has a greater hardness than the control piston.

The advantage of this assembled control piston, which is composed of two parts, is that the actual piston is simplified significantly in terms of its production and is therefore made cheaper. In particular, its complex heat treatment for increasing the hardness at that part which faces toward the plunger rod is dispensed with. Likewise dispensed with is the grinding machining process of said end face, which faces toward the plunger, of the piston. The associated sleeve can be easily mass-produced in a wide variety of shapes and dimensions which are adapted to the respective control piston. The required hardness can be likewise be easily adjusted in a continuous operation. It is subsequently necessary merely for the control piston and sleeve to be connected to one another, with all connection types which are familiar to a person skilled in the art being conceivable, for example a press fit, calking, flanging-over or else adhesive bonding.

It is also conceivable to dispense with fixing the control sleeve to the control piston, since the latter is pressed by the pressure spring against the plunger rod. This ensures that the control sleeve cannot become detached from the control piston.

Further advantageous embodiment variants of the invention are described in the subclaims.

It can for example be gathered from claim 2 that the sleeve is produced from an iron material, is formed as a part which is produced in a non-cutting process, and undergoes a heat treatment in order to increase its hardness. As already explained, such a part can be produced cheaply in a wide variety of shape variants and dimensions.

According to a further additional feature as per claim 3, it is provided that a central elevation, which points in the direction of the plunger rod, is arranged in the base of the sleeve. This can be particularly advantageous when that end face of the control piston which faces toward the plunger rod has, in its center, an elevation which is generated by turning of the control piston between two tips. Said elevation which is arranged in the central part of the control piston is then accommodated by the central elevation of the sleeve, so that a correct and accurately fitting connection of the control piston and sleeve is obtained.

According to one additional further feature as claimed in claim 4, the hollow-cylindrical side wall of the sleeve should have, at the end remote from the base, a flanged edge which has a smaller wall thickness than said hollow-cylindrical side wall. Particularly simple flanging-over is possible as a result of said reduced wall thickness.

In a refinement of the invention as claimed in claim 4, the control piston should be produced from a plastic or from a light metal. Both materials ensure, on account of their lower density than steel, that the overall weight of the control piston is considerably reduced. The control piston can therefore for example be produced as an aluminum cast part or as a plastic part by means of injection molding. In this way, complex cutting machining processes on the control piston are dispensed with. If the axial loads of the piston permit, said piston can, as already explained, be produced from a plastic. Plastics have been proven, with regard to their tribological behavior, to be relatively favorable, in particular after restarting of the internal combustion engine and before there is sufficient hydraulic medium present. In this context, a plastic from the class of polyamides, which can contain reinforcement dispersions such as fibers or particles, has been proven to be advantageous. It is important in this context that the plastics used are fatigue-endurable, and have a sufficient resistance to the medium which is present, in the temperature range of the hydraulic valve. Polyamides are therefore particularly suitable since their good shape stability at high temperatures, the resistance to propellants and lubricants, and the balanced mechanical properties offer a wide variety of possible applications.

It can finally be gathered from the final claim 6 that the plastic piston is connected to the sleeve by means of injection molding. For this purpose, the sleeve which is composed of an iron material and is preferably hardened in a heat treatment process is also inserted into the injection mold, so that a form-fitting connection between the control piston and the sleeve is produced in a simple way.

The invention is explained in more detail on the basis of the exemplary embodiment below.

DETAILED DESCRIPTION OF THE DRAWINGS

Figure 1:
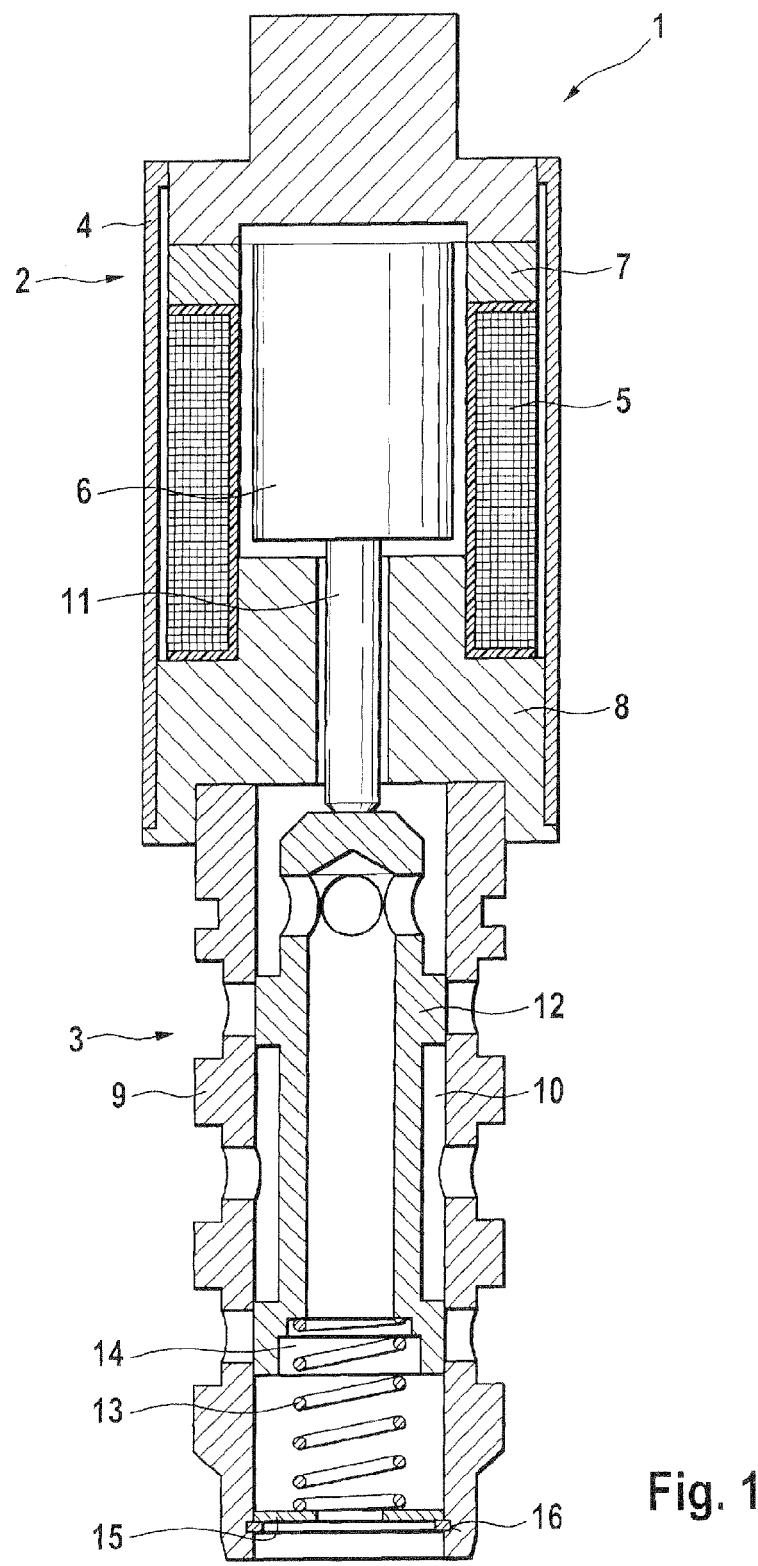
FIG. 1 shows a longitudinal section through an electromagnetic hydraulic valve as per the previous prior art.

FIG. 1 shows an electromagnetic hydraulic valve 1 known from the prior art, which is designed as a proportional valve for controlling a device for the rotational angle adjustment of a camshaft relative to a crankshaft of an internal combustion engine. Said electromagnetic hydraulic valve 1 is composed substantially of an electromagnet 2 and a valve part 3 which is fastened thereto. Here, the electromagnet 2 has a hollow-cylindrical magnet housing 4 in which are arranged a coil winding 5 and an axially moveable magnet armature 6. The coil winding 5 is delimited axially by a first pole shoe 7 and by a second pole shoe 8. The valve part 3 is, in contrast, formed by a hollow-cylindrical valve housing 9 in whose hollow cylinder 10 is accommodated a control piston 12 which can be moved axially by the magnet armature 6 of the electromagnet 2 via a plunger rod 11, and which hollow-cylindrical valve housing 9 has, at the outer periphery, a plurality of encircling annular grooves (likewise not shown in any more detail) with radial bores, which open out into its hollow cylinder 10, for the supply and discharge of the hydraulic medium. Here, the return of the control piston 12 is effected by a pressure spring 13 which acts counter to the force of the magnet armature 6 and which bears at one end in a spring holding bore 14 against the end side of the control piston 12, and at the other end rests on a support element 15 which is fastened in the hollow cylinder 10 of the valve housing 9. Said support element 15 is fixed into a groove 16 which is formed in the valve housing 9

Figure 2:
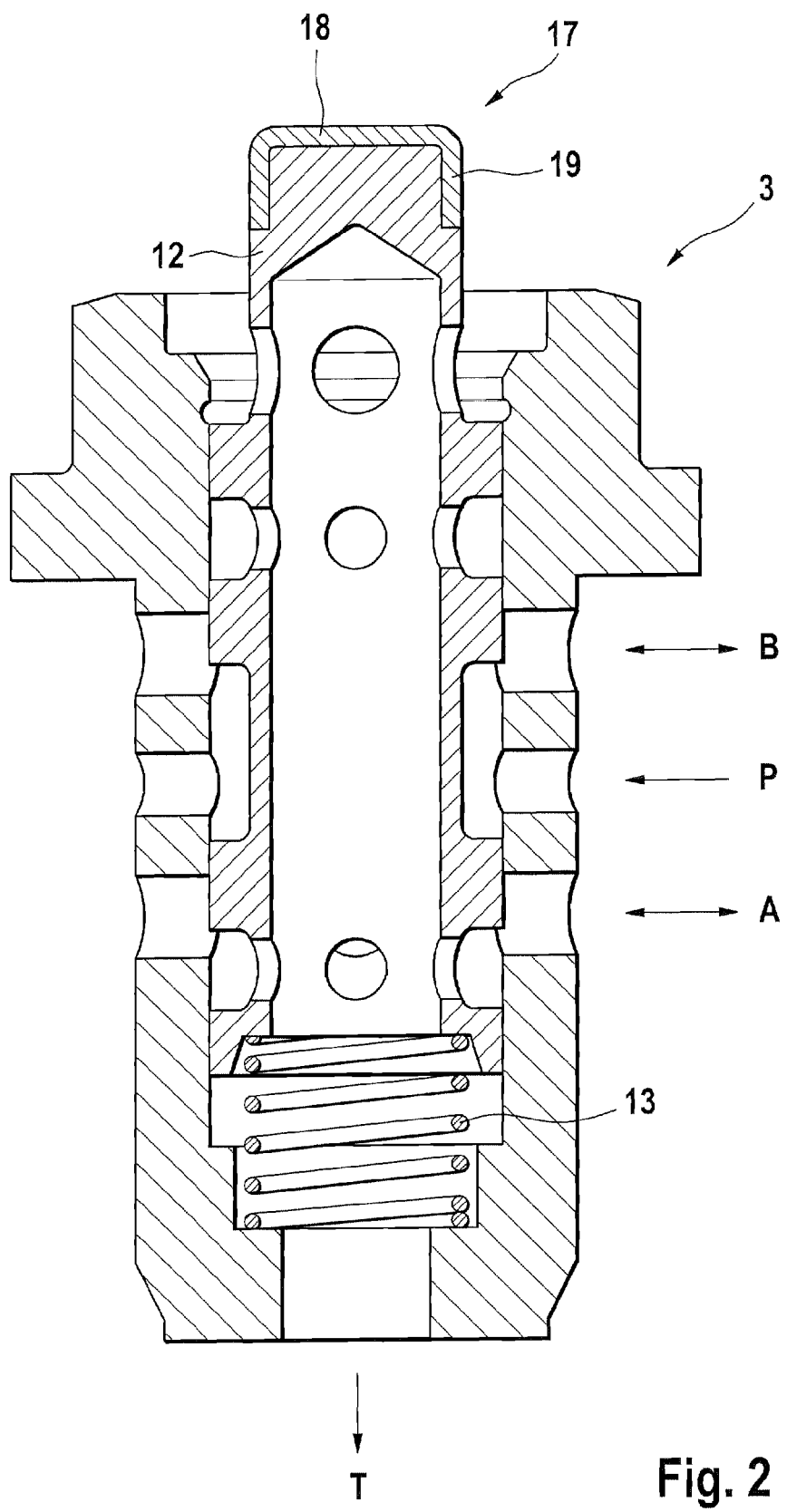
FIG. 2 shows a longitudinal section through the valve part of a hydraulic valve according to the invention.

As can be seen in particular from the valve part 3 illustrated in FIG. 2, the hydraulic valve 1 has, in a known way, a pressure connection denoted by P. A selective supply of hydraulic medium to working connections A, B, for example to pressure chambers in front of end sides of a piston of a device for hydraulic camshaft adjustment, takes place via said pressure connection P. A discharge of the hydraulic medium out of one of said pressure chambers A, B via the working connections A, B in the return flow direction is illustrated by means of the tank connection T. A precise description of the mode of operation of the valve part can be omitted at this point because said valve part is not a constituent part of the present invention and is also sufficiently well-known to a person skilled in the art. For example, a description of the mode of operation can be gathered from DE 198 53 670 A1 which has already been cited as prior art. As can also be gathered from both figures, the control piston 12, which is designed as a hollow cylinder, in the valve housing 9 is moved in the axial direction by the plunger rod 11.

Figure 3:
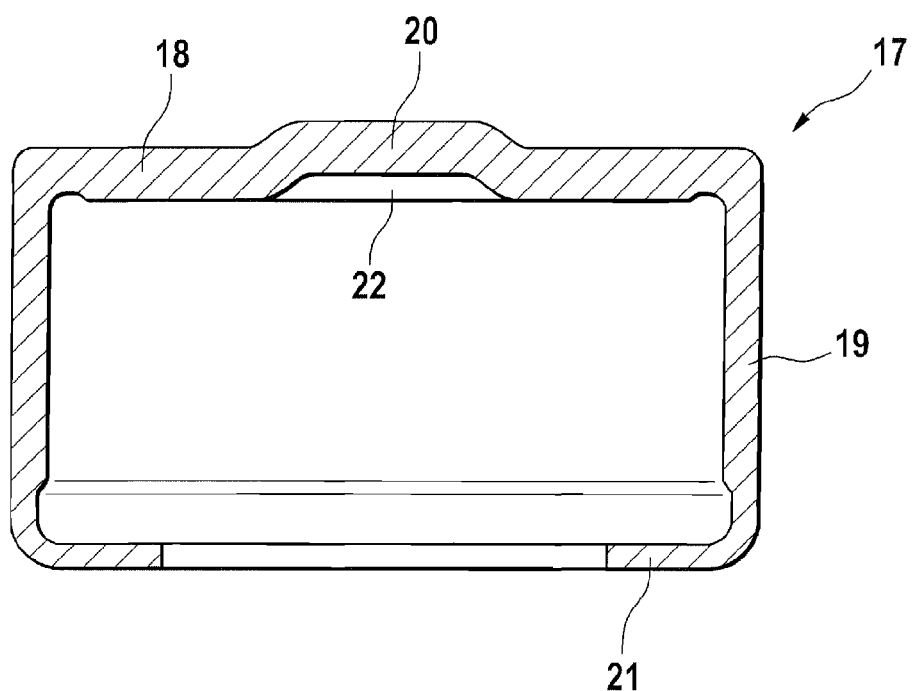
FIG. 3 shows an enlarged illustration of a sleeve which is connected to the control piston.

As can be seen from FIGS. 2 and 3, the invention consists in that the control piston 12 is provided, at its end which points in the direction of the plunger rod 11, with a sleeve 17 which is composed of a base 18 and an associated side wall 19. Said sleeve 18 can for example be pressed onto the control piston 12 and serves ultimately to ensure a hardness value which is adjusted to the respective operating conditions and serves to reduce wear between the plunger rod 11 and the control piston 12.

The sleeve 17, which is illustrated in an enlarged fashion in FIG. 3 without a control piston, is produced as a part which is produced in a non-cutting process and has, at the side facing away from the base 18, a flanged edge 21 which has a smaller cross-sectional thickness than the side wall 19. Furthermore, the base 18 is provided with a central elevation 20 which points in the direction of the plunger rod 11 and against which said plunger rod 11 bears. Formed in the interior of the sleeve 17 is a clearance 22 caused by the central elevation 20. Said clearance 22 ensures that elevations which are under some circumstances present in the central part of the control piston 12 can be accommodated. The sleeve is case-hardened and tempered and has a hardness of 710+100 HV1.

LIST OF REFERENCE SYMBOLS

1 Hydraulic valve
2 Electromagnet
3 Valve part
4 Magnet housing
5 Coil winding
6 Magnet armature
7 First pole shoe
8 Second pole shoe
9 Valve housing
10 Hollow cylinder
11 Plunger rod
12 Control piston
13 Pressure spring 14 Spring holding bore
15 Support element
16 Groove
17 Sleeve
18 Base
19 Side wall
20 Central elevation
21 Flanged edge
22 Clearance
A Working connection
B Working connection
P Pressure connection
T Tank connection

The invention claimed is:

1. An electromagnetic hydraulic valve controlling a device for a rotational angle adjustment of a camshaft relative to a crankshaft of an internal combustion engine, comprising:
   an electromagnet having a hollow-cylindrical magnet housing, at least one coil winding, an axially moveable magnet armature, and a first and a second pole shoe; and
   a valve part having a hollow-cylindrical valve housing in which is accommodated a control piston which can be moved axially by the magnet armature of the electromagnet via a plunger rod, with pressure medium connections being formed in the valve housing, which pressure medium connections can be connected to or separated from one another as a function of the position of the control piston, and with a return of the control piston being affected by a pressure spring which acts counter to a force of the magnet armature,
   wherein a sleeve, which is composed of a base and a hollow-cylindrical side wall, is arranged on an end of the control piston which is situated in a direction of the plunger rod, and the sleeve has a greater hardness than the control piston, and
   wherein the hollow-cylindrical side wall of the sleeve has, at an end remote from the base, a flanged edge which has a smaller wall thickness than the hollow-cylindrical side wall.

2. The electromagnetic hydraulic valve as claimed in claim 1, wherein the sleeve is produced from an iron material, is formed as a part which is produced in a non-cutting process, and undergoes a heat treatment in order to increase its hardness.

3. The electromagnetic hydraulic valve as claimed in claim 1, wherein a central elevation, which points in the direction of the plunger rod, is arranged in the base of the sleeve.

4. The electromagnetic hydraulic valve as claimed in claim 1, wherein the control piston is produced from a plastic or from a light metal.

5. The electromagnetic hydraulic valve as claimed in claim 4, wherein the control piston is connected to the sleeve by means of injection molding.

* * * * *